(12) United States Patent
Kim

(10) Patent No.: US 11,979,105 B2
(45) Date of Patent: May 7, 2024

(54) APPARATUS AND METHOD FOR CONTROLLING MOTOR

(71) Applicant: HL MANDO CORPORATION, Gyeonggi-do (KR)

(72) Inventor: Taesik Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 17/700,295

(22) Filed: Mar. 21, 2022

(65) Prior Publication Data

US 2023/0198451 A1 Jun. 22, 2023

(30) Foreign Application Priority Data

Dec. 22, 2021 (KR) ........................ 10-2021-0185007

(51) Int. Cl.
*H02P 29/20* (2016.01)
*B62D 5/04* (2006.01)
*H02P 29/64* (2016.01)
*H02P 29/68* (2016.01)

(52) U.S. Cl.
CPC ............ *H02P 29/20* (2016.02); *B62D 5/0463* (2013.01); *H02P 29/64* (2016.02); *H02P 29/68* (2016.02)

(58) Field of Classification Search
CPC .......... H02P 29/20; H02P 29/64; H02P 29/68; B62D 5/0463
See application file for complete search history.

(56) References Cited

U.S. PATENT DOCUMENTS

| | | | |
|---|---|---|---|
| 2017/0070178 A1* | 3/2017 | Koseki | H02P 25/22 |
| 2021/0091691 A1* | 3/2021 | Kimura | H02P 8/12 |
| 2022/0173671 A1* | 6/2022 | Yamashita | H02P 6/08 |
| 2022/0393627 A1* | 12/2022 | Kitagawa | H02M 7/53871 |

\* cited by examiner

*Primary Examiner* — Zoheb S Imtiaz
(74) *Attorney, Agent, or Firm* — Ladas & Parry, LLP

(57) ABSTRACT

Disclosed are an apparatus and method for controlling a motor. An exemplary embodiment of the present disclosure provides an apparatus for controlling an operation of a motor, the apparatus including: a first motor control unit connected to a first winding part of the motor and configured to control the operation of the motor; and a second motor control unit connected to a second winding part of the motor and configured to control the operation of the motor, in which the first motor control unit turns on or off current paths formed between the first motor control unit and the motor by controlling switches included in the first motor control unit, and the second motor control unit turns on or off current paths formed between the second motor control unit and the motor by controlling switches included in the second motor control unit.

20 Claims, 11 Drawing Sheets

APPARATUS AND METHOD FOR CONTROLLING MOTOR

CROSS-REFERENCE TO RELATED APPLICATIONS

This application claims benefit and priority to Korean Patent Application No. 10-2021-0185007, filed on Dec. 22, 2021, with the Korean Intellectual Property Office, the disclosure of which is incorporated herein in its entirety by reference.

TECHNICAL FIELD

The present disclosure relates to an apparatus and method for controlling a motor, and more particularly, to an apparatus and method for operating a motor by using different current paths.

BACKGROUND

The contents disclosed in this section only provide background information in respect to the present disclosure but do not constitute the prior art.

A steering assist system refers to a system that provides an appropriate sense of steering to a driver according to traveling situations so that the driver may feel the sense of steering according to a rotation of a steering wheel when the driver rotates the steering wheel (steering intention).

Examples of the steering assist system include a hydraulic power steering (HPS) system configured to provide a sense of steering by using a hydraulic pressure generated by operating a pump, and an electronic power steering (EPS) system configured to provide a sense of steering by using a reaction force generated by operating a motor. The reaction force is provided by a reaction force motor connected through a steering wheel, a column, and the like.

Recently, a steer-by-wire (SbW) system is applied, which transmits steering intention of the driver by means of electrical connection between a steering wheel and a road wheel without mechanical connection.

The SbW system performs a steering operation by controlling the road wheel, which is connected to a steering motor, by operating the steering motor under the control of an electronic control unit (ECU) that detects the rotation of the steering wheel (steering intention).

The SbW system may include a road wheel actuator (RWA) configured to move the road wheel by transmitting the steering intention of the driver to the road wheel, a steering feedback actuator (SFA) configured to provide a reaction force of the steering wheel, and a control device. The RWA corresponds to a steering output actuator, and the SFA corresponds to a steering input actuator.

The SFA may include a steering wheel, a steering shaft, a reaction force motor, a steering angle sensor, a steering torque sensor, and the like. The steering intention of the driver may be inputted to the SFA through the steering wheel.

The reaction force motor may provide the reaction force to the steering wheel by receiving a control signal from a control device. Specifically, the reaction force motor may generate reaction force torque by being operated on the basis of the control signal provided from the control device.

The control device may receive information on the steering intention of the driver (steering information) from the SFA and output the control signal, which corresponds to the information, to the RWA. The steering information may include steering angles, steering torque, and the like.

The control device may receive feedback in respect to information on a reaction force generated by the road wheel, a change in alignment torque, and vibration from a road surface from the RWA and output the control signal, which corresponds to the feedback, to the SFA. The SFA may provide an appropriate sense of steering to the driver by generating the reaction force torque by operating the reaction force motor depending on the control signal outputted by the control device.

SUMMARY

The present disclosure has been made in an effort to provide an apparatus and method capable of improving a heat capacity by operating a reaction force motor by using different current paths.

An exemplary embodiment of the present disclosure provides an apparatus for controlling an operation of a motor, the apparatus including: a first motor control unit connected to a first winding part of the motor and configured to control the operation of the motor; and a second motor control unit connected to a second winding part of the motor and configured to control the operation of the motor, in which the first motor control unit turns on or off current paths formed between the first motor control unit and the motor by controlling switches included in the first motor control unit, and the second motor control unit turns on or off current paths formed between the second motor control unit and the motor by controlling switches included in the second motor control unit.

Another exemplary embodiment of the present disclosure provides a method performed by an apparatus for controlling an operation of a motor, the method including: determining, by a first motor control unit connected to a first winding part of the motor and a second motor control unit connected to a second winding part of the motor, whether to control switches respectively included in the first motor control unit and the second motor control unit; and turning on or off, by the first motor control unit, current paths formed between the first motor control unit and the motor by controlling the switches included in the first motor control unit, and turning on or off, by the second motor control unit, current paths formed between the second motor control unit and the motor by controlling the switches included in the second motor control unit.

According to the present disclosure, the current circulates through the plurality of current paths in the event of overheating, which makes it possible to prevent the problems such as deterioration in performance, a short circuit, an open circuit that may be caused by the overheating. Therefore, it is possible to provide more robust performance.

According to the present disclosure, the current circulates through the plurality of current paths in the event of overheating without decreasing the value of the circulating current, thereby preventing the misalignment between the steering input actuator and the steering output actuator.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 8 to 11 are views for explaining an example in which the current paths are sequentially turned on.

DETAILED DESCRIPTION

Figure 1:
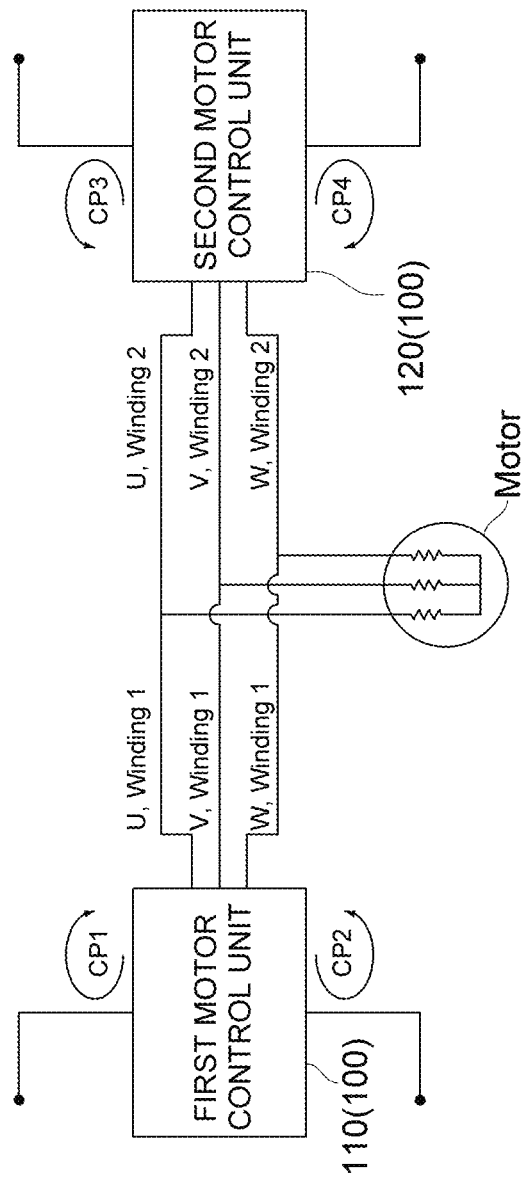
FIG. 1 is an exemplary block diagram illustrating an apparatus for controlling an operation of a motor.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, some embodiments of the present disclosure will be described in detail with reference to the illustrative drawings. In giving reference numerals to constituent elements of the respective drawings, it should be noted that the same constituent elements will be designated by the same reference numerals, if possible, even though the constituent elements are illustrated in different drawings. In addition, in the description of the present disclosure, the specific descriptions of publicly known related configurations or functions will be omitted when it is determined that the specific descriptions may obscure the subject matter of the present disclosure.

The terms first, second, A, B, (a), and (b) may be used to describe constituent elements of the present disclosure. These terms are used only for the purpose of discriminating one constituent element from another constituent element, and the nature, the sequences, or the orders of the constituent elements are not limited by the terms. Throughout the specification, unless explicitly described to the contrary, the words "comprise" or "have" and variations such as "comprises", "comprising", "has", or "having", will be understood to imply the inclusion of stated elements but not the exclusion of any other elements. In addition, the term "unit", "part", "module", or the like, which is described in the specification, means a unit that performs at least one function or operation, and the "unit", "part", or the like may be implemented by hardware, software, or a combination of hardware and software.

A reaction force motor may generate braking torque for various purposes. For example, in the event of failure of a motor such as an open circuit or a short circuit, the reaction force motor may generate the braking torque by generating circulating current by short-circuiting inner switches to provide the reaction force. As another example, the reaction force motor may generate braking torque to provide a driver motion function in a situation in which only a vehicle is operated only by the RWA without operating the SFA, like an autonomous vehicle. Further, the reaction force motor may generate braking torque to provide the reaction force to the steering wheel during the ingress and egress.

At the time of generating the braking torque by using the reaction force motor, a value of current (circulating current) circulating in the reaction force motor and an inverter is large, which causes a large amount of heat (overheat) in the reaction force motor and the inverter.

The overheating occurring in the reaction force motor and the inverter may degrade the performance of the control device and the reaction force motor in the related art and cause contact with peripheral devices or modules, which causes failure such as an open circuit or a short circuit of a winding part.

The EPS decreases a value of circulating current in the event of overheating to reduce the performance of the reaction force motor and relatively increase torque burdened to the driver, thereby solving the problem.

However, because the SbW has no mechanical power transmission device, the magnitude of the braking torque of the reaction force motor relatively decreases and the magnitude of the reaction force torque applied by the steering intention relatively decreases when the value of the circulating current decreases and the performance of the reaction force motor decreases.

Therefore, the RWA is stopped at a target lock end according to the steering intention of the driver, whereas the SFA may pass over the target lock end. That is, the RWA and the SFA may be misaligned.

The present specification provides an apparatus and a method that may prevent not only the problem of overheating but also the misalignment between the RWA and the SFA by circulating the current through a plurality of current paths instead of decreasing the value of circulating current in the event of overheating during the process of generating the braking torque by using the reaction force motor.

Figure 2:
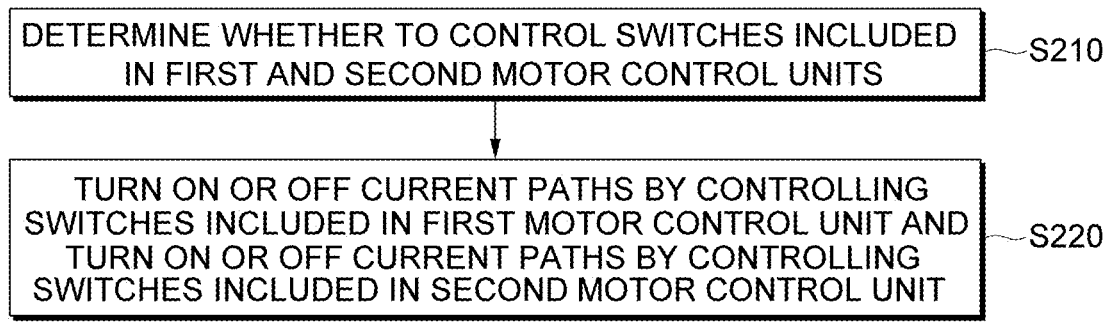
FIG. 2 is a flowchart for explaining a method of controlling an operation of the motor.

FIG. 1 is an exemplary block diagram illustrating an apparatus 100 for controlling an operation of a motor (hereinafter, referred to as a 'control apparatus'), and FIG. 2 is a flowchart for explaining a method of controlling an operation of the motor (hereinafter, referred to as a 'control method').

As illustrated in FIG. 1, the control apparatus 100 may include a first motor control unit 110 and a second motor control unit 120.

The motor may be the above-mentioned reaction force motor. In addition, the motor may be a dual wound rotor motor designed to have a structure (a first winding part and a second winding part) capable of performing two pairs of different multi-phase inputs as an input of the motor by bisecting a single motor.

The first motor control unit 110 and the second motor control unit 120 may be implemented by an electronic control unit (ECU) and include one or more processors (controllers), memories, and I/O interfaces. In addition, the first motor control unit 110 and the second motor control unit 120 may communicate with each other by sequentially controlling and turning on switches to be described below.

The first motor control unit 110 may be connected to the motor through the first winding part (Winding 1). In addition, the first motor control unit 110 may turn on or off a plurality of current paths formed between the first motor control unit 110 and the motor by controlling the switches included in the first motor control unit 110 (S220).

The current path, which is turned on or off under the control of the first motor control unit 110, may be provided in plural. For example, the current paths, which are turned on or off under the control of the first motor control unit 110, may include a first current path CP1 and a second current path CP2.

The second motor control unit 120 may be connected to the motor through the second winding part (Winding 2). In addition, the second motor control unit 120 may turn on or off the plurality of current paths formed between the second motor control unit 120 and the motor by controlling the switches included in the second motor control unit 120 (S220).

The current path, which is turned on or off under the control of the second motor control unit 120, may be provided in plural. For example, the current paths, which are turned on or off under the control of the second motor control unit 120, may include a third current path CP3 and a fourth current path CP4.

The first motor control unit 110 and the second motor control unit 120 may perform step S210 of determining whether to control the switches before controlling the switches (turning on or off the current paths).

Step S210 may be performed on the basis of a temperature of the motor or an inverter (to be described below) positioned in the motor. For example, when the temperature of the motor or the inverter positioned in the motor is equal to or higher than a preset temperature or exceeds the preset temperature (overheating occurs), the first motor control unit 110 and the second motor control unit 120 may determine to control the switches.

According to the present disclosure, the current circulates through the plurality of current paths in the event of overheating during the process of generating the braking torque by using the reaction force motor, such that a current load may be reduced, and a heat capacity may be improved, thereby solving the problem of overheating. In addition, according to the present disclosure, the value of the circulating current is not decreased, which makes it possible to prevent the misalignment between the RWA and the SFA.

Figure 3:
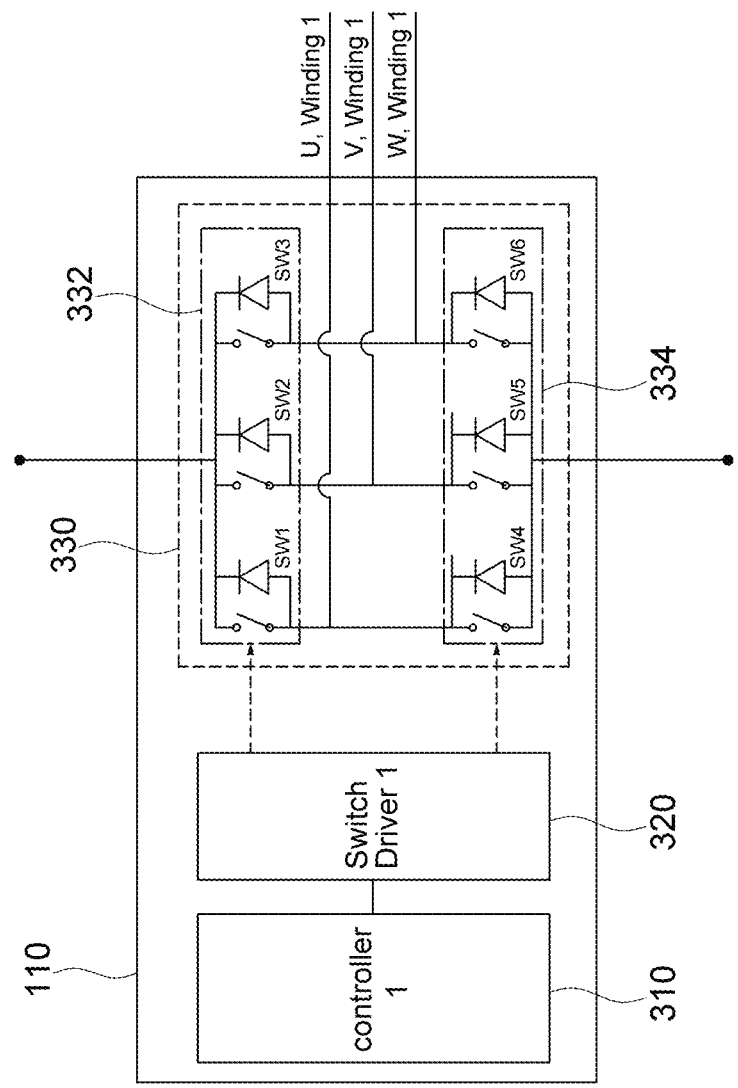
FIG. 3 is an exemplary block diagram illustrating a first motor control unit.
Figure 4:
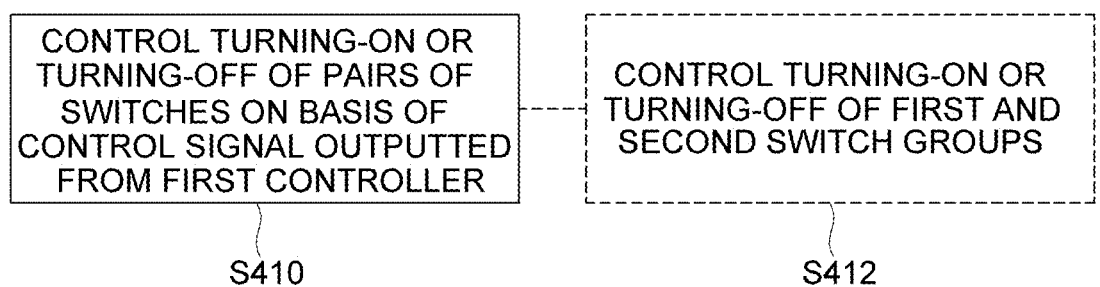
FIG. 4 is a flowchart for explaining a method of controlling an operation of the motor by the first motor control unit.

FIG. 3 is an exemplary block diagram illustrating the first motor control unit 110, and FIG. 4 is a flowchart for explaining the method (control method) of controlling the operation of the motor by the first motor control unit 110.

As illustrated in FIG. 3, the first motor control unit 110 may include a first controller 310, a first switch driver 320, and a first inverter 330.

The first controller 310 may receive a steering angle and steering torque of the steering wheel from a steering angle sensor (not illustrated) and a steering torque sensor (not illustrated) and calculate reaction force torque corresponding to the steering angle and steering torque. In addition, the first controller 310 may calculate braking torque corresponding to the calculated reaction force torque and output a control signal (first reaction force control signal) so that the reaction force motor generates the calculated braking torque.

The first controller 310 may receive a temperature of the reaction force motor and a temperature of the first inverter 330 from a temperature sensor (not illustrated) and determine whether the received temperature is equal to or higher than a preset temperature or exceeds the preset temperature (whether overheating occurs). In addition, when the first controller 310 determines that overheating has occurred, the first controller 310 may output a control signal (first path control signal) for creating the current paths.

The first switch driver 320 may receive the first reaction force control signal and control the first inverter 330 so that a switching operation corresponding to the first reaction force control signal is performed. In addition, the first switch driver 320 may receive the first path control signal and control the first inverter 330 so that a switching operation corresponding to the first path control signal is performed.

The first inverter 330 may include pairs of switches connected to respective phases of the first winding part (Winding 1), for example, a first phase U, a second phase V, and a third phase W. The pairs of switches may form one or more of the plurality of current paths by being turned on or off on the basis of the first path control signal outputted from the first switch driver 320 (S410).

The pairs of switches may include two switches SW1 and SW4 connected to the first phase, two switches SW2 and SW5 connected to the second phase, and two switches SW3 and SW6 connected to the third phase. The switches SW1 to SW6 may be implemented as field effect transistors (FETs).

The switches SW1, SW2, and SW3 may define a first switch group 332. The first switch group 332 may be positioned in any one current path (first current path) among the current paths connected to the motor through the first winding part (Winding 1). Therefore, the first current path may be turned on or off by a turn-on operation or a turn-off operation of the first switch group 332.

The switches SW4, SW5, and SW6 may define a second switch group 334. The second switch group 334 may be positioned in another current path (second current path) among the current paths connected to the motor through the first winding part (Winding 1). Therefore, the second current path may be turned on or off by a turn-on operation or a turn-off operation of the second switch group 334.

The first switch group 332 and the second switch group 334 may be turned on or off on the basis of the first path control signal outputted from the first switch driver 320 (S412), such that one or both of the first current path and the second current path may be formed.

Figure 5:
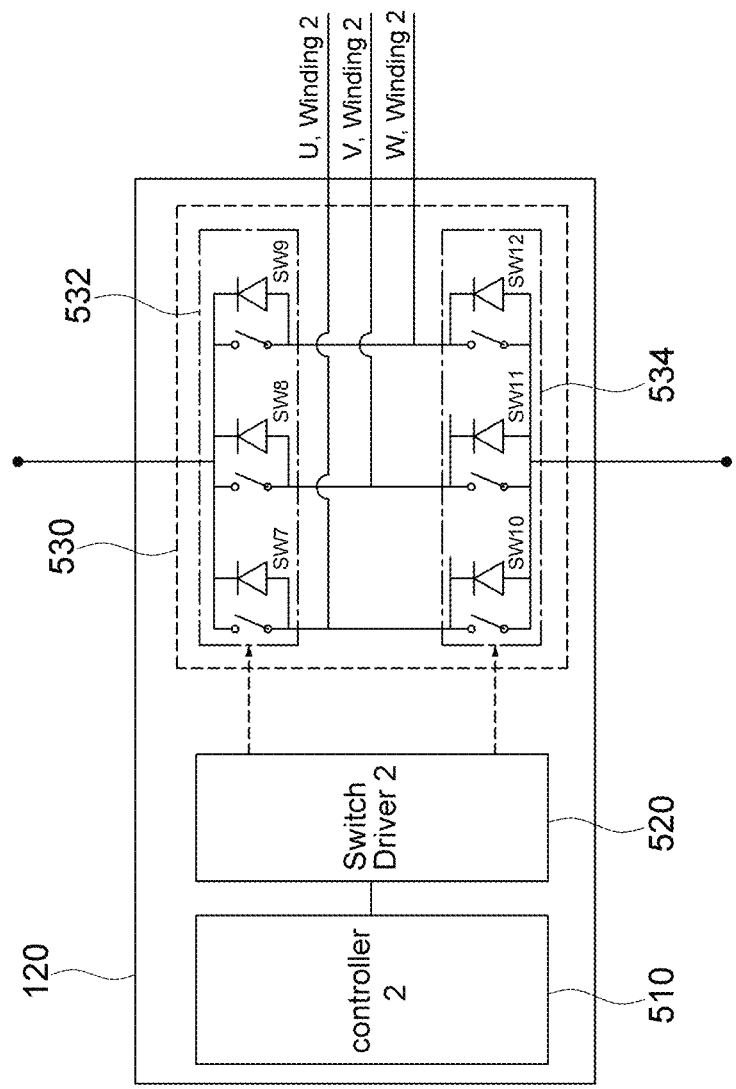
FIG. 5 is an exemplary block diagram illustrating a second motor control unit.
Figure 6:
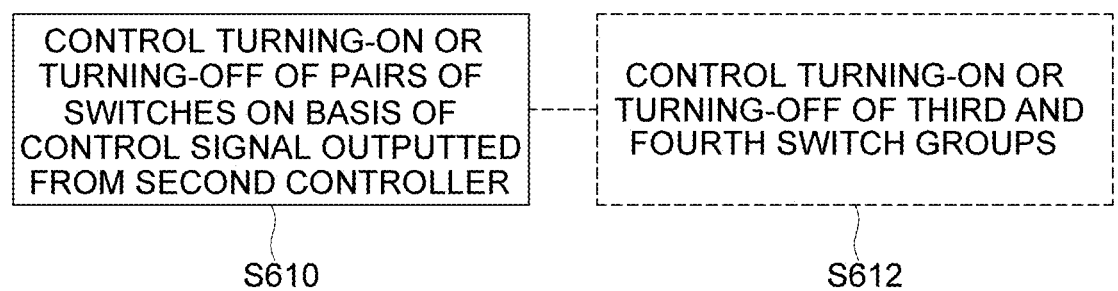
FIG. 6 is a flowchart for explaining a method of controlling an operation of the motor by the second motor control unit.

FIG. 5 is an exemplary block diagram illustrating the second motor control unit 120, and FIG. 6 is a flowchart for explaining the method (control method) of controlling the operation of the motor by the second motor control unit 120.

As illustrated in FIG. 5, the second motor control unit 120 may include a second controller 510, a second switch driver 520, and a second inverter 530.

The second controller 510 may receive a steering angle and steering torque of the steering wheel from the steering angle sensor (not illustrated) and the steering torque sensor (not illustrated) and calculate reaction force torque corresponding to the steering angle and steering torque. In addition, the second controller 510 may calculate braking torque corresponding to the calculated reaction force torque and output a control signal (second reaction force control signal) so that the reaction force motor generates the calculated braking torque.

The second controller 510 may receive a temperature of the reaction force motor and a temperature of the second inverter 530 from the temperature sensor (not illustrated) and determine whether the received temperature is equal to or higher than a preset temperature or exceeds the preset temperature (whether overheating occurs). In addition, when the second controller 510 determines that overheating has occurred, the second controller 510 may output a control signal (second path control signal) for creating the current paths.

The second switch driver 520 may receive the second reaction force control signal and control the second inverter 530 so that a switching operation corresponding to the second reaction force control signal is performed. In addition, the second switch driver 520 may receive the second path control signal and control the second inverter 530 so that a switching operation corresponding to the second path control signal is performed.

The second inverter 530 may include pairs of switches connected to respective phases of the second winding part (Winding 2), for example, a first phase U, a second phase V, and a third phase W. The pairs of switches may form one or more of the plurality of current paths by being turned on or off on the basis of the second path control signal outputted from the second switch driver 520 (S610).

The pairs of switches may include two switches SW7 and SW10 connected to the first phase, two switches SW8 and SW11 connected to the second phase, and two switches SW9 and SW12 connected to the third phase. The switches SW7 to SW12 may be implemented as field effect transistors (FETs).

The switches SW7, SW8, and SW9 may define a third switch group 532. The third switch group 532 may be positioned in any one current path (third current path) among the current paths connected to the motor through the second winding part (Winding 2). Therefore, the third current path may be turned on or off by a turn-on operation or a turn-off operation of the third switch group 532.

The switches SW10, SW11, and SW12 may define a fourth switch group 534. The fourth switch group 534 may be positioned in another current path (fourth current path) among the current paths connected to the motor through the second winding part (Winding 2). Therefore, the fourth current path may be turned on or off by a turn-on operation or a turn-off operation of the fourth switch group 534.

The third switch group 532 and the fourth switch group 534 may be turned on or off on the basis of the second path control signal outputted from the second switch driver 520 (S612), such that one or both of the third current path and the fourth current path may be formed.

Figure 7:
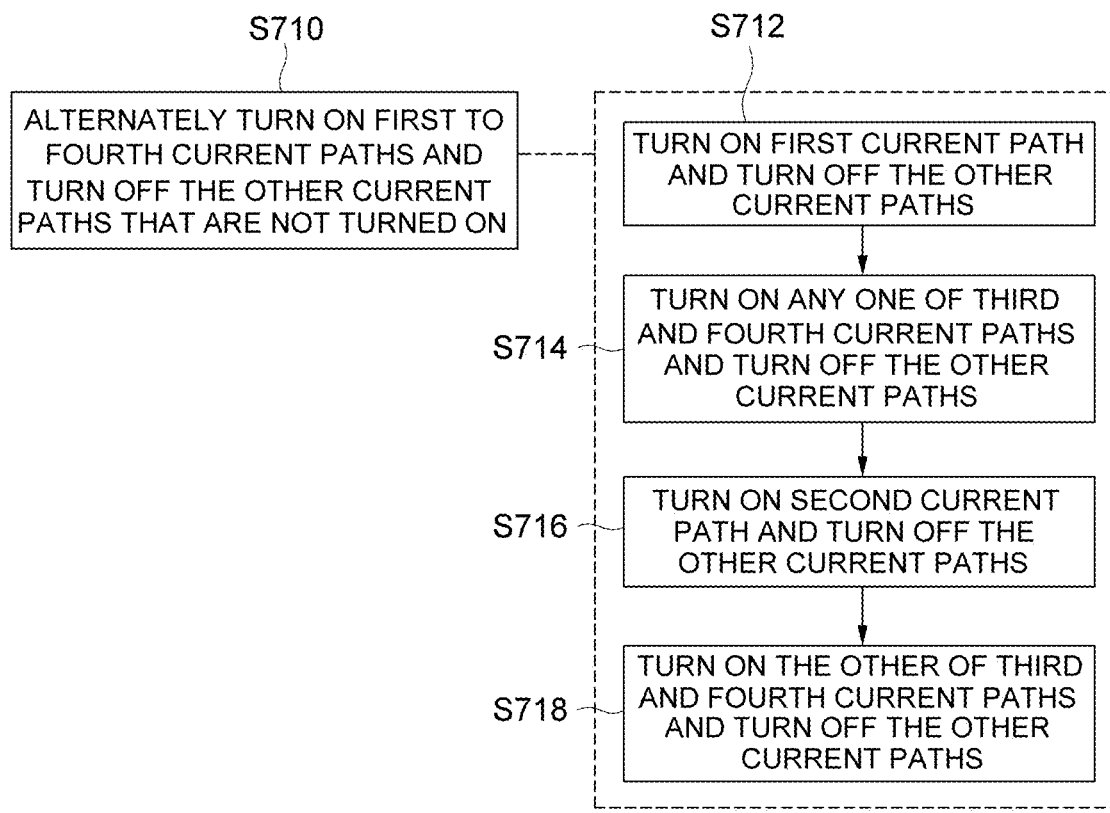
FIG. 7 is a flowchart for explaining a method of sequentially turning on current paths.

FIG. 7 is a flowchart for explaining a method of sequentially turning on current paths.

The first and second motor control units 110 and 120 (first and second switch drivers) may sequentially turn on the first to fourth current paths by controlling and turning on or off the respective first to fourth switch groups 332, 334, 532, and 534.

That is, the first and second switch drivers 320 and 520 may control turning-on of any one switch group among the first to fourth switch groups 332, 334, 532, and 534 and control turning-off of the remaining switch groups (S710). This control may sequentially turn on the first to fourth current paths and turn off the remaining current paths except for the current paths that are turned on.

According to the embodiments, the first and second switch drivers 320 and 520 may alternately turn on the first and second switch groups 332 and 334 and the third and fourth switch groups 532 and 534.

That is, the first and second switch drivers 320 and 520 circulate the current through any one of the first and second current paths by turning on any one of the first and second switch groups 332 and 334 and then circulate the current through any one of the third and fourth current paths by turning on any one of the third and fourth switch groups 532 and 534.

This is to circulate the current sequentially through the current paths relatively distantly disposed to prevent the situation in which heat is repeatedly generated at a narrow point, thereby reducing a current load and improving a heat capacity.

FIGS. 8 to 11 illustrate an example in which the first to fourth current paths are alternately turned on by alternately turning on the first to fourth switch groups 332, 334, 532, and 534.

Figure 8:
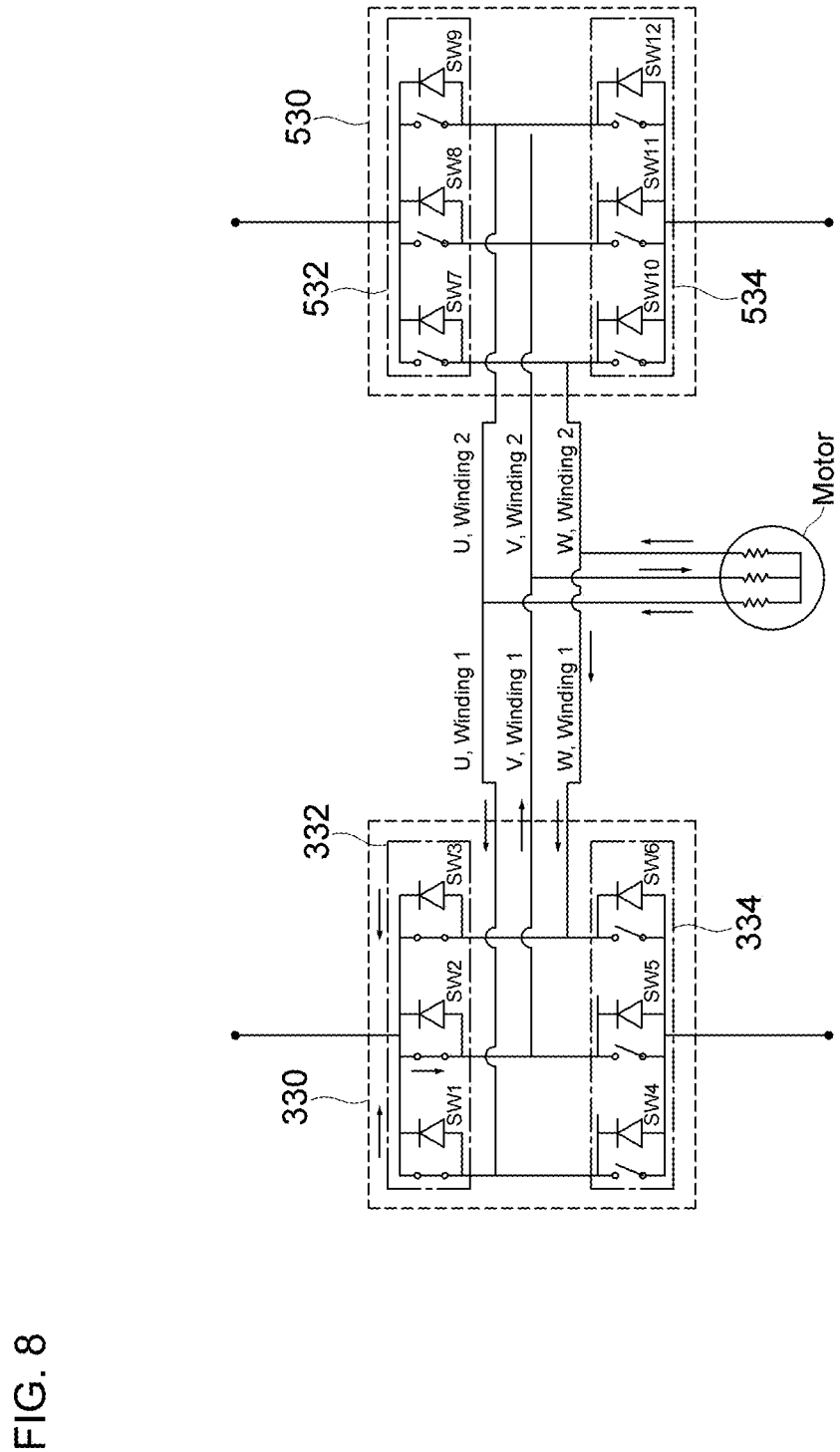

As illustrated in FIG. 8, the first switch driver 320 may perform control to turn on the first switch group 332 and turn off the second switch group 334, and the second switch driver 520 may perform control to turn off the third and fourth switch groups 532 and 534 (S712).

In this case, since the first current path is turned on and the second to fourth current paths are turned off among the first to fourth current paths, the current may circulate through the first current path as indicated by the arrows.

Figure 9:
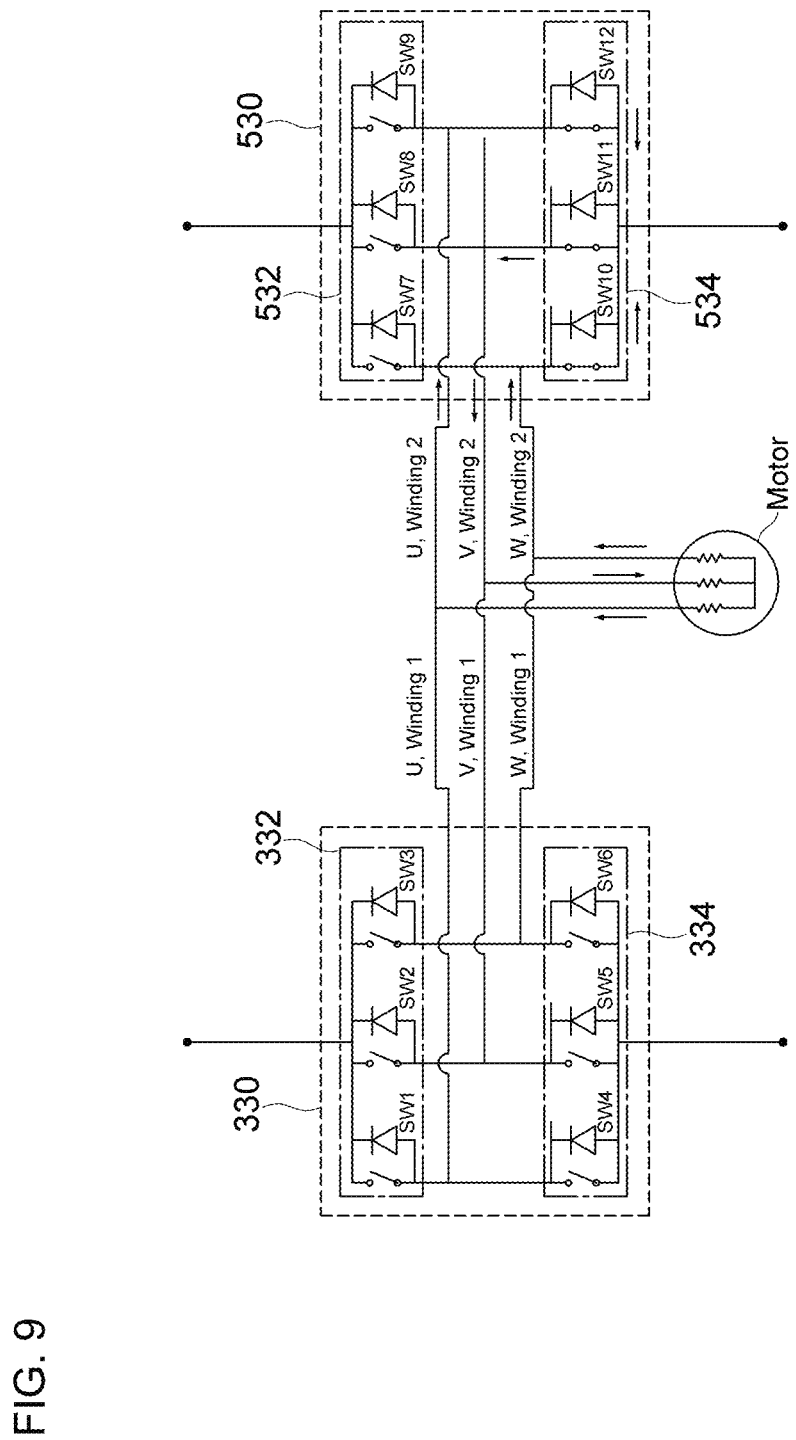

As illustrated in FIG. 9, after the first current path is turned on, the first switch driver 320 may control turning-off of the first and second switch groups 332 and 334, and the second switch driver 520 may control turning-on of any one of the third and fourth switch groups 532 and 534 and control turning-off of the other of the third and fourth switch groups 532 and 534 (S714).

In this case, the current path of the third and fourth current paths, in which the turned-on switch group is positioned, is turned on, and the remaining current path is turned off. As indicated by the arrows, the current may circulate through the current path in which the turned-on switch group is positioned.

According to the embodiments, to more effectively prevent the occurrence of overheating, the first and second switch drivers 320 and 520 may turn on the switch group (fourth switch group) positioned distant from the first switch group 332 among the third and fourth switch groups 532 and 534 and turn off the switch group (third switch group in the drawings) positioned distant from the first switch group 332.

Figure 10:
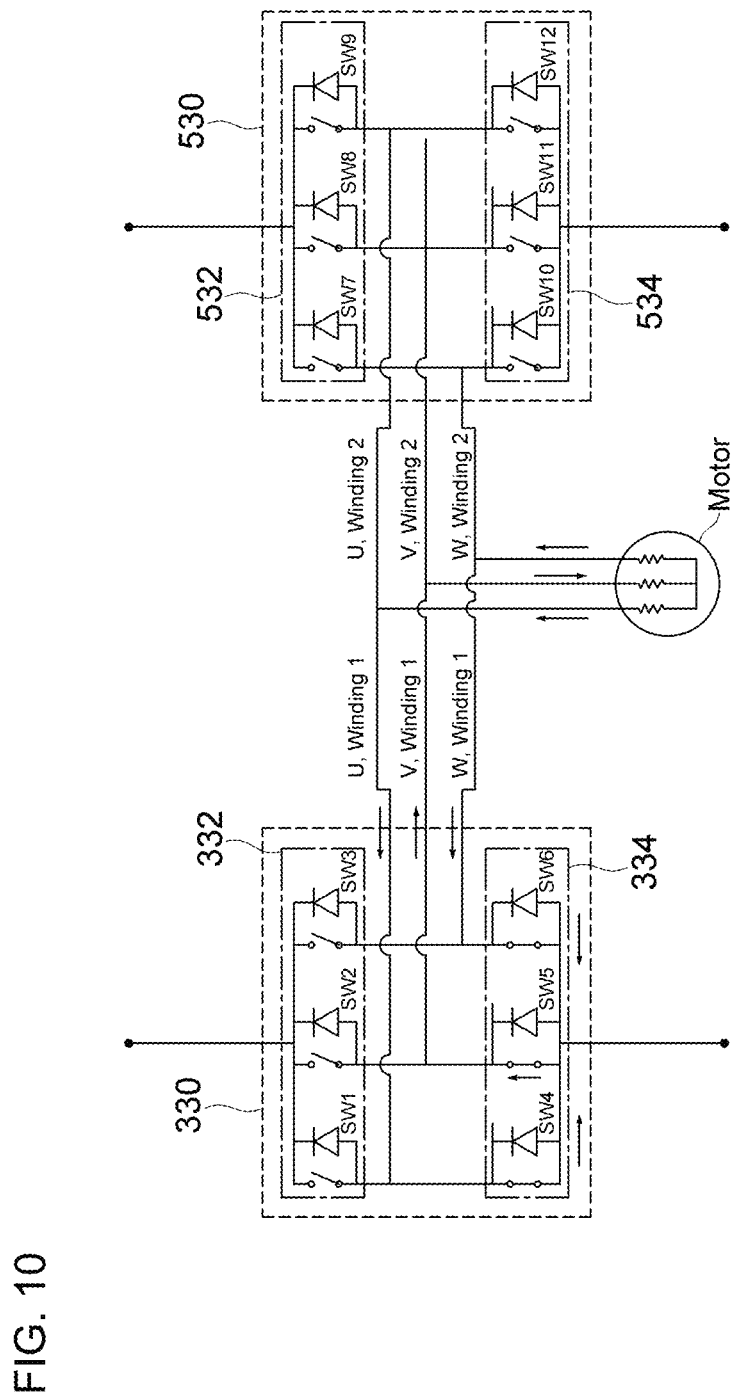

As illustrated in FIG. 10, after any one of the third and fourth switch groups 532 and 534 is turned on, the first switch driver 320 may perform control to turn off the first switch group 332 and turn on the second switch group 334, and the second switch driver 520 may perform control to turn off the third and fourth switch groups 532 and 534 (S716).

In this case, since the second current path is turned on and the first current path, the third current path, and the fourth current path are turned off among the first to fourth current paths, the current may circulate through the second current path as indicated by the arrows.

Figure 11:
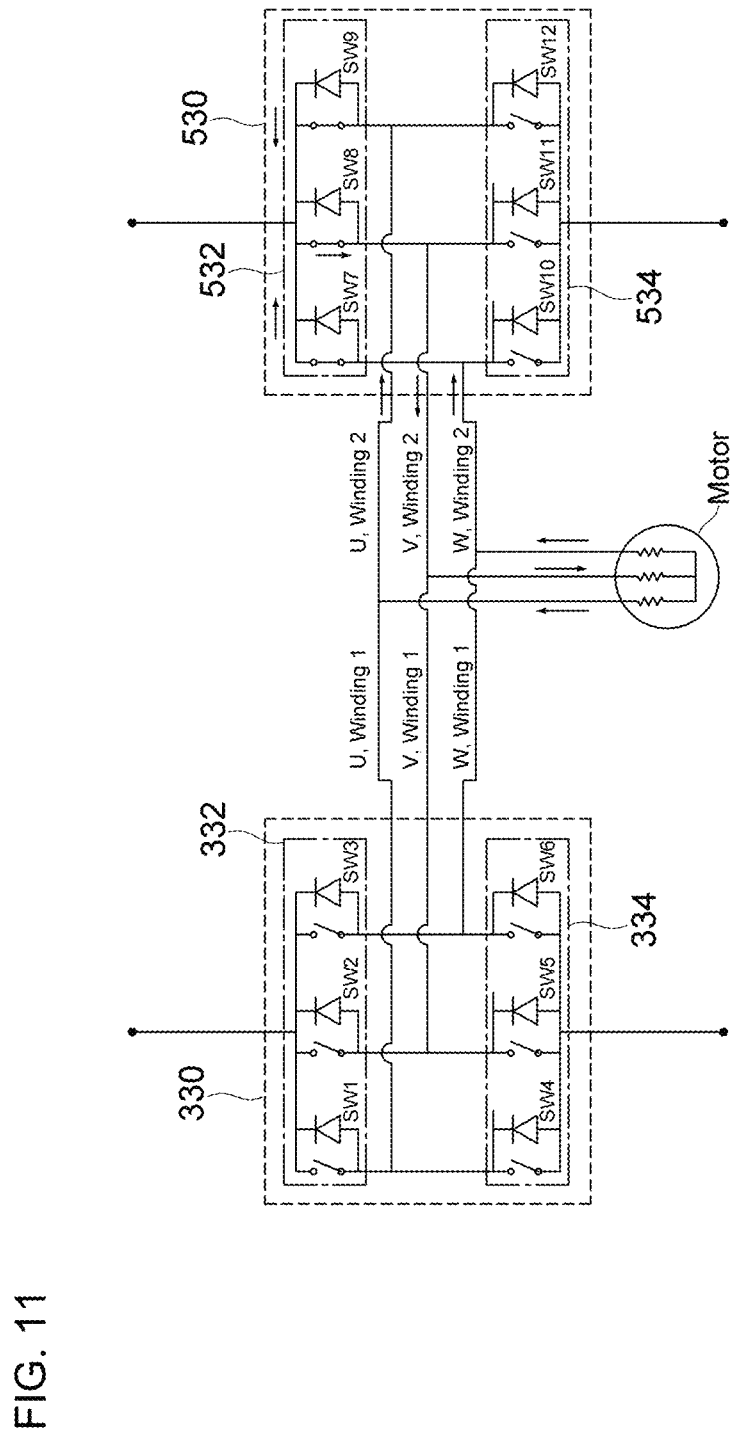

As illustrated in FIG. 11, after the second current path is turned on, the first switch driver 320 may control turning off of the first and second switch groups 332 and 334, and the second switch driver 520 may control turning-on of any one of the third and fourth switch groups 532 and 534 and control turning-off of the other of the third and fourth switch groups 532 and 534 (S718). In this case, the switch group, which is turned on, is the switch group that has been turned off in step S714, and the switch group, which is turned off, is the switch group that has been turned on in step S714.

In this case, the current path (third current path) of the third and fourth current paths, in which the turned-on switch group (e.g., third switch group) is positioned, is turned on, and the remaining current path is turned off. The current may circulate through the current path (third current path), in which the turned-on switch group (e.g., third switch group) is positioned, as indicated by the arrows.

FIGS. 2, 4, 6, and 7 illustrate that the steps are sequentially performed, but this illustration is given to exemplarily describe the technical spirit of the embodiment of the present disclosure. In other words, various modifications and deformations may be made by performing the steps while changing the order illustrated in FIGS. 2, 4, 6, and 7 or performing one or more of the steps in parallel by those skilled in the art without departing from the intrinsic characteristics of the embodiment of the present disclosure. Accordingly, the present disclosure is not limited to the time sequence illustrated in FIGS. 2, 4, 6, and 7.

The above description is simply given for illustratively describing the technical spirit of the present embodiment, and those skilled in the art to which the present embodiment pertains will appreciate that various changes and modifications are possible without departing from the essential characteristic of the present embodiment. Therefore, the embodiments are provided for illustrative purposes only but not intended to limit the technical concept of the present embodiment. The scope of the technical concept of the present embodiment is not limited thereto. The protective scope of the present embodiment should be construed based on the following claims, and all the technical spirit in the equivalent scope thereto should be construed as falling within the scope of the present embodiment.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An apparatus for controlling an operation of a motor, the apparatus comprising:
    a first motor control unit connected to a first winding part of the motor and configured to control an operation of the motor; and
    a second motor control unit connected to a second winding part of the motor and configured to control the operation of the motor,
    wherein the first motor control unit is configured to turn on or off current paths formed between the first motor control unit and the motor by controlling switches included in the first motor control unit, and the second motor control unit is configured to turn on or off current paths formed between the second motor control unit and the motor by controlling switches included in the second motor control unit,
    wherein the switches included in the first motor control unit are grouped into a plurality of first switch groups and the switches included in the second motor control unit are grouped into a plurality of second switch groups, and
    wherein the first and second motor control units are configured to, when detecting that a temperature of the motor or one or more of the switches included in the first and second motor control units is higher than or equal to a preset temperature, alternatingly perform an operation of turning on one switch group of the first switch groups of the first motor control unit and turning off another or other of the first switch groups of the first motor control unit and all of the second switch groups of the second motor control unit and another operation of turning on one switch group of the second switch groups of the second motor control unit and turning off another or other of the second switch groups of the second motor control unit and all of the first switch groups of the first motor control unit.

2. The apparatus of claim 1, wherein the first motor control unit comprises:
    a first controller;
    a first switch driver; and
    a first inverter including pairs of switches connected to respective phases of the first winding part, and
    wherein the first switch driver controls turning-on or turning-off of the pairs of switches on the basis of a control signal outputted from the first controller.

3. The apparatus of claim 2, wherein the pairs of switches connected to the respective phases of the first winding part comprises:
    a first switch group comprising a switch connected to a first phase of the first winding part, a switch connected to a second phase of the first winding part, and a switch connected to a third phase of the first winding part, the first switch group being positioned in a first current path; and
    a second switch group comprising the other switch connected to the first phase of the first winding part, the other switch connected to the second phase of the first winding part, and the other switch connected to the third phase of the first winding part, the second switch group being positioned in a second current path, and
    wherein the first switch driver controls turning-on or turning-off of the first and second switch groups.

4. The apparatus of claim 1, wherein the second motor control unit comprises:
    a second controller;
    a second switch driver; and
    a second inverter including pairs of switches connected to respective phases of the second winding part, and
    wherein the second switch driver controls turning-on or turning-off of the pairs of switches on the basis of a control signal outputted from the second controller.

5. The apparatus of claim 4, wherein the pairs of switches connected to the respective phases of the second winding part comprises:
    a third switch group comprising a switch connected to a first phase of the second winding part, a switch connected to a second phase of the second winding part, and a switch connected to a third phase of the second winding part, the third switch group being positioned in a third current path; and
    a fourth switch group comprising the other switch connected to the first phase of the second winding part, the other switch connected to the second phase of the second winding part, and the other switch connected to the third phase of the second winding part, the fourth switch group being positioned in a fourth current path, and
    wherein the second switch driver controls turning-on or turning-off of the third and fourth switch groups.

6. The apparatus of claim 5, wherein the first and second switch drivers alternately turn on the first to fourth current paths by controlling turning-on or turning-off of the first to fourth switch groups.

7. The apparatus of claim 6, wherein the first and second switch drivers turn on the first current path by controlling turning-on of the first switch group, controlling turning-off of the second switch group, and controlling turning-off of the third and fourth switch groups and turn on any one of the third and fourth current paths by controlling turning-off of the first and second switch groups, controlling turning-on of any one of the third and fourth switch groups, and controlling turning-off of the other of the third and fourth switch groups, after turning on the first current path.

8. The apparatus of claim 7, wherein the second switch driver controls turning-on of the switch group positioned distant from the first switch group among the third and fourth switch groups, and controls turning-off of the switch group positioned close to the first switch group among the third and fourth switch groups.

9. The apparatus of claim 7, wherein the first and second switch drivers turn on the second current path by controlling turning-off of the first switch group, controlling turning-on of the second switch group, and controlling turning-off of the third and fourth switch groups, after turning on any one of the third and fourth current paths.

10. The apparatus of claim 1, wherein the first and second switch drivers are configured to, after turning on the one switch group of the first switch groups of the first motor control unit, turn off the one switch group of the first switch groups of the first motor control unit and turn on the one switch group of the second switch groups of the second motor control unit, which is located most distant from the one switch group of the first switch groups of the first motor control unit, among the second switch groups.

11. A method performed by an apparatus for controlling an operation of a motor, the method comprising:
  determining, by a first motor control unit connected to a first winding part of the motor and a second motor control unit connected to a second winding part of the motor, whether to control switches respectively included in the first motor control unit and the second motor control unit; and
  turning on or off, by the first motor control unit, current paths formed between the first motor control unit and the motor by controlling the switches included in the first motor control unit, and turning on or off, by the second motor control unit, current paths formed between the second motor control unit and the motor by controlling the switches included in the second motor control unit,
  wherein the switches included in the first motor control unit are grouped into a plurality of first switch groups and the switches included in the second motor control unit are grouped into a plurality of second switch groups, and
  wherein when detecting that a temperature of the motor or one or more of the switches included in the first and second motor control units is higher than or equal to a preset temperature, an operation of turning on one switch group of the first switch groups of the first motor control unit and turning off another or other of the first switch groups of the first motor control unit and all of the second switch groups of the second motor control unit and another operation of turning on one switch group of the second switch groups of the second motor control unit and turning off another or other of the second switch groups of the second motor control unit and all of the first switch groups of the first motor control unit are alternatingly performed. the first and second motor control units output a control signal for creating the current paths.

12. The method of claim 11, wherein the first motor control unit comprises a first controller, a first switch driver, and a first inverter including pairs of switches connected to respective phases of the first winding part, and the turning-on or turning-off of the current paths comprises controlling, by the first switch driver, turning-on or turning-off of the pairs of switches on the basis of a control signal outputted from the first controller.

13. The method of claim 12, wherein the pairs of switches connected to the respective phases of the first winding part comprise:
  a first switch group comprising a switch connected to a first phase of the first winding part, a switch connected to a second phase of the first winding part, and a switch connected to a third phase of the first winding part, the first switch group being positioned in a first current path; and
  a second switch group comprising the other switch connected to the first phase of the first winding part, the other switch connected to the second phase of the first winding part, and the other switch connected to the third phase of the first winding part, the second switch group being positioned in a second current path, and
  wherein the controlling of the turning-on or turning-off of the pairs of switches comprises controlling, by the first switch driver, turning-on or turning-off of the first and second switch groups.

14. The method of claim 13, wherein the second motor control unit comprises a second controller, a second switch driver, and a second inverter including pairs of switches connected to respective phases of the second winding part, and the turning-on or turning-off of the current paths comprises controlling, by the second switch driver, turning-on or turning-off of the pairs of switches connected to the respective phases of the second winding part on the basis of a control signal outputted from the second controller.

15. The method of claim 14, wherein the pairs of switches connected to the respective phases of the second winding part comprises:
  a third switch group comprising a switch connected to a first phase of the second winding part, a switch connected to a second phase of the second winding part, and a switch connected to a third phase of the second winding part, the third switch group being positioned in a third current path; and
  a fourth switch group comprising the other switch connected to the first phase of the second winding part, the other switch connected to the second phase of the second winding part, and the other switch connected to the third phase of the second winding part, the fourth switch group being positioned in a fourth current path, and
  wherein the controlling of the turning-on or turning-off of the pairs of switches comprises controlling, by the second switch driver, turning-on or turning-off of the third and fourth switch groups.

16. The method of claim 15, wherein the turning-on or turning-off of the current paths comprises alternately turning on, by the first and second switch drivers, the first to fourth current paths by controlling turning-on or turning-off of the first to fourth switch groups.

17. The method of claim 16, wherein the turning-on or turning-off of the current paths further comprises:
  turning on the first current path by controlling turning-on of the first switch group and controlling turning-off of the second switch group by the first switch driver and controlling turning-off of the third and fourth switch groups by the second switch driver; and
  controlling turning-off of the first and second switch groups by the first switch driver and controlling turning-on of any one of the third and fourth switch groups and controlling turning-off of the other of the third and fourth switch groups by the second switch driver, after the first current path is turned on, such that any one of the third and fourth current paths is turned on.

18. The method of claim 17, wherein the turning-on of any one of the third and fourth current paths comprises controlling turning-on of the switch group positioned distant from the first switch group among the third and fourth switch groups, and controlling turning-off of the switch group positioned close to the first switch group among the third and fourth switch groups, by the second switch driver.

19. The method of claim 17, wherein the turning-on or turning-off of the current paths further comprises controlling turning-off of the first switch group and controlling turning-on of the second switch group by the first switch driver and controlling turning-off of the third and fourth switch groups by the second switch driver, after any one of the third and fourth current paths is turned on, such that the second current path is turned on.

20. The method of claim 11, wherein after turning on the one switch group of the first switch groups of the first motor control unit, the one switch group of the first switch groups of the first motor control unit is turned off and the one switch group of the second switch groups of the second motor control unit, which is located most distant from the one switch group of the first switch groups of the first motor control unit, among the second switch groups is turned on.

* * * * *